Sept. 8, 1959     D. A. BROWN     2,903,104
T JOINT
Filed Dec. 20, 1956
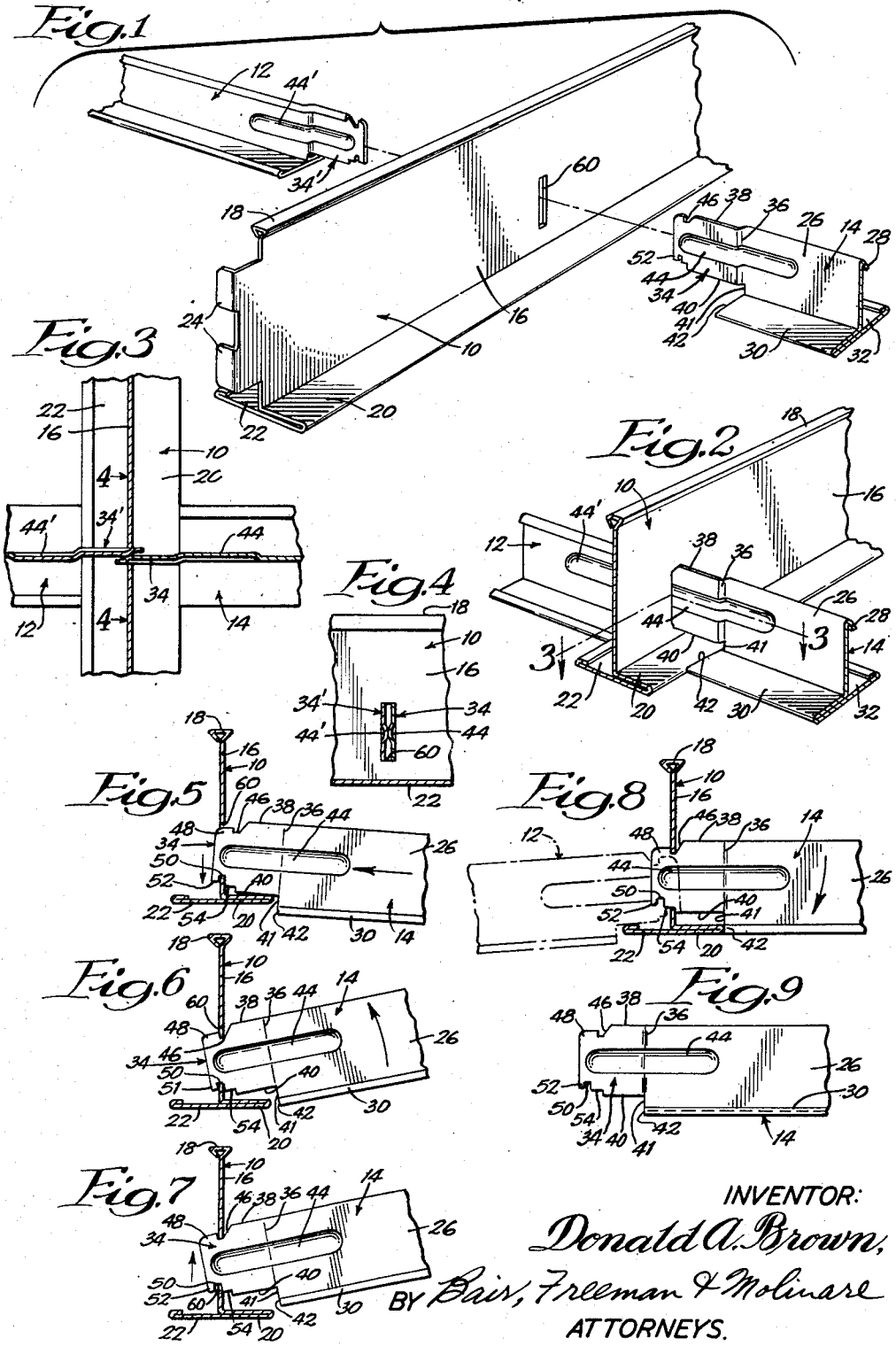
INVENTOR:
Donald A. Brown,
BY Bair, Freeman & Molinare
ATTORNEYS.

United States Patent Office 2,903,104
Patented Sept. 8, 1959

2,903,104
T JOINT

Donald A. Brown, Westlake, Ohio, assignor to Donn Products, Inc.

Application December 20, 1956, Serial No. 629,599

3 Claims. (Cl. 189—36)

This invention relates generally to an assembly of intersecting structural members, and more particularly to a rigidly interlocking and demountable T junction.

In structural systems of the type employed in the building and related construction fields, a rigid interlocking grid of cooperating T members is a convenient and desirable arrangement. For example, suspended ceilings of the type comprising main T's installed on predetermined centers and supported by wire hangers or the like, and cooperatingly interconnected by a plurality of cross T's also installed on predetermined centers, serve as a convenient and serviceable system for supporting modules or panels such as acoustical units, lighting fixtures, and like ceiling elements. The present invention is directed to a novel coupling structure for assembling a pair of cross T's in end-to-end rigid assembly with a main T.

It is a primary object of this invention to provide a pair of cross T members having identical connector portions formed with a novel hook and notch configuration for effecting rigid cooperating assembly with a slotted main T member.

It is another object of this invention to provide a connector configuration for a cross T of the aforesaid type, wherein connection with a fixed main T may be effected with a minimum of movement of the cross T above or below the plane of the main T, thereby enabling cross T's of substantial length to be assembled without interference or obstructing engagement with closely adjacent structural members or surfaces.

With these and other objects in view, my invention consists in the construction, arrangement and combination of the various parts of my T joint, whereby the objects contemplated are obtained as hereinafter more fully set forth, pointed out in my claims, and illustrated in the accompanying drawing, wherein:

Figure 1 is a perspective view showing a main T and a cooperating pair of cross T's prior to interconnected assembly;

Figure 2 is another perspective view showing the elements of Figure 1 coupled together to form a rigid T joint;

Figure 3 is a horizontal cross sectional view taken substantially as indicated along the line 3—3 in Figure 2;

Figure 4 is a vertical cross sectional view taken substantially as indicated along the line 4—4 in Figure 3;

Figures 5 through 8 are a series of vertical cross sectional views illustrating one sequence of movement for inserting the connector portion of a cross T through the coupling slot of the main T; and Figure 9 is a side elevational view showing in detail the hook and notch configuration of the connector portion of a cross T.

Referring now more particularly to Figures 1–3 of the drawing, I have indicated generally at 10 a main T member adapted to cooperate with a pair of cross T members 12 and 14 to form a rigid interlocking T joint. The T comprises a one-piece sheet metal structure particularly folded and formed to define an upstanding web portion 16 extending between a top flange 18 and a pair of overlapping bottom flanges 20 and 22 defining a base portion. The flanges 20 and 22 extend outwardly from the plane of the web 16 substantially at right angles thereto so as to provide supporting surfaces upon which acoustical panels or the like may be positioned. The terminal end of the main T 10 provides coupling elements 24 for cooperative attachment either to the next of a successive series of main T's or to other mounting elements for rigidly supporting the main T in fixed and generally horizontal alignment.

The cross T's 12 and 14 are substantially identical for opposed cooperation with each other and with the main T 10. The cross T 14 will now be described in detail and it will be understood that the cross T 12 is of the same form and the portions thereof will be referred to by the same numerals as the portions of the cross T 14 with the additional notation of a prime superscript. The cross T 14 comprises an upstanding web portion 26 extending between a top edge or flange 28 and a pair of overlapping and outwardly extending bottom flanges 30 and 32 defining a base portion, disposed substantially at right angles to the plane of the web 26. The cross T terminates in an end connector portion 34 which is laterally offset relative to the plane of the web 26 by a step portion 36. The connector 34 is of vertically smaller extent than the web 26 from a top edge 38 to a bottom edge 40 to provide exposed end edges 41 and 42 of the web 26 and bottom flanges 30, 32, respectively.

The connector portion 34 and the adjacent web portion 26 of the cross T's 14 is provided with a continuous embossment 44. As seen in Figure 1 of the drawing, the embossment 44 of cross T 14 extends inwardly into the plane of the drawing. The embossment 44' of cross T 12, being an identical member in reversed or opposed relation, extends outwardly from the plane of the drawing in Figure 1. This embossment provides a mechanical reinforcement for insuring rigid alignment of the connector portion 34 in a laterally offset plane parallel to the plane of the web 26. In addition, the embossments 44 and 44' effect opposed contacting engagement with each other when the connector portions 34 and 34' of the cross T's 14 and 12 are in cooperative locking engagement with each other, as will hereinafter appear.

As best seen in Figure 9 of the drawing, the connector portion 34, and likewise the connector portion 34' of the cross T 12, is formed with a very particular configuration of hook and notch portions. It is this configuration which constitutes an essential feature of the present invention. A top notch 46 is formed downwardly and forwardly of the top edge 38 of the connector portion 34. A hook element 48 extends forwardly of the notch 46 and terminates below the top edge 38. A pivot notch 50 is formed forwardly and above the bottom edge 40, and defines outwardly thereof a hook element 52. A seating shoulder 54 is defined intermediate the pivot notch 50 and the bottom edge 40 rearwardly of the notch 50.

The web 16 of the main T 10 is formed with a narrow vertical slot 60 of predetermined height and width relative to the dimensions of the cross T connector portions. The height of the slot 60 is slightly less than the distance between the outer edges of the top hook 48 and bottom hook 52, and slightly greater than the distance between the notch 46 and the seating shoulder 54. The width of the slot 60 is slightly less than the combined width of the connector portions 34 and 34' and their embossments 44 and 44', so that the embossments will be compressed slightly to effect a tightly engaged and locking cooperation of the connector portions when positioned within the slot 60, as best seen in Figures 3 and 4 of the drawing.

Referring now more particularly to Figures 5–8 of the drawing, the cooperative relation between the specific configuration of the connector portions of the cross T's and the main T slot will be described. In order to first insert the outermost end of the connector portion 34 through the slot 60, it is necessary to incline the cross T 14 slightly relative to the generally horizontal main T 10. Although such inclination may be in an upward and downward direction so as to enable insertion of either the top hook 48 or the bottom hook 52, one in advance of the other, I have illustrated an inclination in a downward direction so as to first project the bottom notch 52 through the slot 60. It will be apparent that the bottom edge of the slot 60 may be received within the pivot notch 50, thereby providing a dimensional height of the connector which is less than the height of the slot 60 so as to enable the top hook 48 to pass freely through the slot 60. This is done by pivoting the cross T 14 about a fulcrum at the pivot notch 50, as seen in Figure 6. The connector portion may then be raised upwardly within the slot 60 so as to dispose the top edge of the slot 60 within the top notch 46, as seen in Figure 7. The height of the connector portion between the notch 46 and the seating shoulder 54, being smaller than the height of the slot 60, enables the cross T 14 to be next pivoted downwardly to bring the bottom edge of the slot 60 into seated engagement against the rear vertical edge of the shoulder 54, and the top edge of the slot 60 into seated engagement against the rear vertical edge of the top hook 48. It will be apparent that insertion of the connector portion requires a series of three pivoting or inclining movements, none of which necessitate any substantial angular inclination of the cross T relative the horizontal T.

The other T 12 may now be inserted in the same manner through the slot 60 in forced side-by-side engagement with the connector portion of the cross T 14. When thus positioned, the two cross T's cooperate with the main T to effect a rigidly interconnected T joint.

Changes may be made in the construction and arrangement of the parts of my T joint without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. A demountable assembly of intersecting structural members comprising, a main T member having a slot formed therein, a pair of cross T members each providing an edged connector portion at its end, each connector portion having a first notch extending inwardly at its one edge to define a first hook element forwardly thereof and inwardly of said one edge, each connector portion having a second notch extending inwardly at its opposite edge forwardly of said first notch to define a second hook element forwardly thereof and inwardly of said opposite edge, said opposite edge being further formed with an inwardly extending shoulder portion rearwardly and outwardly of said second notch to provide a seating edge in substantial alignment with said first notch, said cross T members being removably secured to said main T by insertion of said connector portions through said main T slot in opposed contacting engagement, said slot having a long dimension slightly less than the distance across each connector portion from the first hook element to the second and slightly greater than the distance from the innermost portion of the first notch to the innermost edge of the shoulder portion, one edge of said slot seating within said first connector notches and the other edge of said slot seating against said shoulder portions and being restrained thereby.

2. A demountable assembly of intersecting structural members comprising, a main T member having a base portion and a perpendicular web portion, said main T web portion having a slot formed therein perpendicular to the plane of said base portion, a pair of cross T members each providing a web portion terminating at its end in a forwardly extending, edged connector portion, each of said connector portions being laterally offset relative to the plane of the web portion and being narrower between its edges than the width of said web portion to provide an abutment edge, each connector portion having a first notch extending inwardly at its one edge to define a first hook element forwardly thereof and inwardly of said one edge, each connector portion having a second notch extending inwardly at its opposite edge forwardly of said first notch to define a second hook element forwardly thereof and inwardly of said opposite edge, said opposite edge being further formed with an inwardly extending shoulder portion rearwardly and outwardly of said second notch to provide a seating edge in substantial alignment with said first notch, said cross T members being removably secured to said main T by insertion of said connector portions through said main T slot in opposed contacting engagement, said slot having a long dimension slightly less than the distance across each connector portion from the first hook element to the second and slightly greater than the distance from the innermost portion of the first notch to the innermost edge of the shoulder portion, one edge of said slot seating within said first connector notches, the other edge of said slot seating against said shoulder portions and being restrained thereby, and the length of said connector portions permitting seating of the opposed base edges of said main T member against said abutment edges.

3. A demountable assembly of intersecting structural members in accordance with claim 2, wherein each cross T has an elongated reinforcing embossment extending from the web portion through said offset and along the length of said connector portion.

References Cited in the file of this patent

UNITED STATES PATENTS

| | | |
|---|---|---|
| 860,884 | Priddle | July 23, 1907 |
| 917,354 | Phillips | Apr. 6, 1909 |
| 1,843,356 | Carlough | Feb. 2, 1932 |
| 2,535,263 | Budne | Dec. 26, 1950 |
| 2,689,630 | Drury | Sept. 21, 1954 |

FOREIGN PATENTS

| | | |
|---|---|---|
| 397,496 | Great Britain | Aug. 23, 1933 |